United States Patent [19]

Brodsky

[11] Patent Number: 5,236,527
[45] Date of Patent: Aug. 17, 1993

[54] METHOD FOR MAKING LABELLED PADLOCKS

[75] Inventor: Gerald Brodsky, Stamford, Conn.
[73] Assignee: Idesco Corp., New York, N.Y.
[21] Appl. No.: 818,551
[22] Filed: Jan. 9, 1992
[51] Int. Cl.$^5$ .................................... B32B 31/26
[52] U.S. Cl. .......................... 156/85; 156/86; 70/51; 70/52; 70/53; 70/54; 70/55; 70/56; 264/230; 264/342 R
[58] Field of Search .................. 156/85, 86, 84; 264/230, 342 R; 70/20, 51, 52, 54, 55, 56, 53, 39, 405, 456 R; 40/299, 330, 331, 655

[56] References Cited

U.S. PATENT DOCUMENTS

| 2,774,993 | 12/1956 | Hagen et al. | 156/86 |
|---|---|---|---|
| 2,818,168 | 12/1957 | Tobey . | |
| 3,252,234 | 5/1966 | Goodman . | |
| 3,829,348 | 8/1974 | Spiegel et al. | 156/86 |
| 3,983,725 | 10/1976 | Manuel | 70/55 |
| 3,985,852 | 10/1976 | Evans | 264/342 R |
| 4,018,640 | 4/1977 | Amberg | 156/86 |
| 4,134,280 | 1/1979 | Pelavin et al. | 70/55 |
| 4,159,586 | 7/1979 | Blum . | |
| 4,224,813 | 9/1980 | Hampton | 70/53 |
| 4,312,523 | 1/1982 | Haines . | |
| 4,425,390 | 1/1984 | Changani et al. | 264/342 R |
| 4,446,183 | 5/1984 | Savagian . | |
| 4,479,317 | 10/1984 | Hanna . | |
| 4,534,190 | 8/1985 | Stanich . | |
| 4,907,359 | 3/1990 | Berman . | |

Primary Examiner—Caleb Weston
Attorney, Agent, or Firm—Alan H. Levine; Howard F. Mandelbaum

[57] ABSTRACT

A labelled padlock has a body circumscribed by a heat shrunk plastic sleeve displaying a notice. The notice can be imprinted on a hermetically sealed label adhesively affixed to the body of the padlock before a transparent sleeve is applied, or on a surface of the sleeve itself.

7 Claims, 3 Drawing Sheets

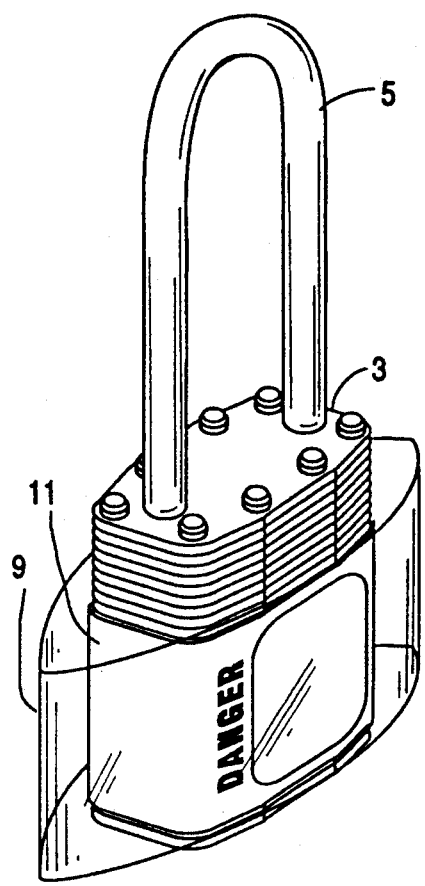
FIG. 4
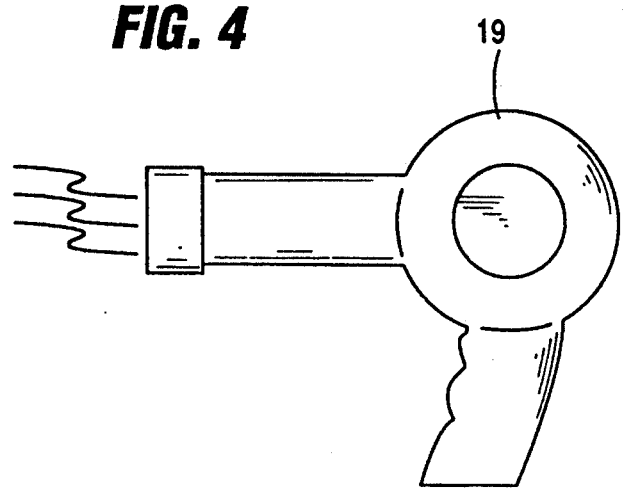
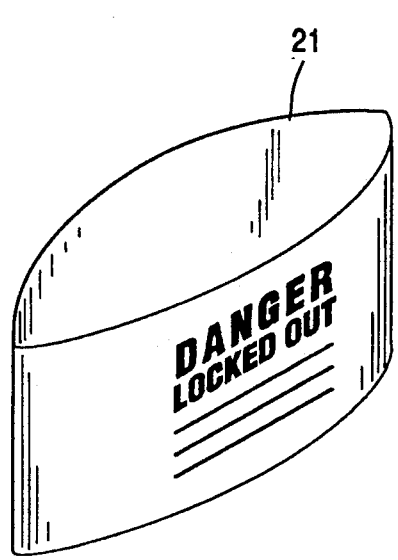
FIG. 5
FIG. 6
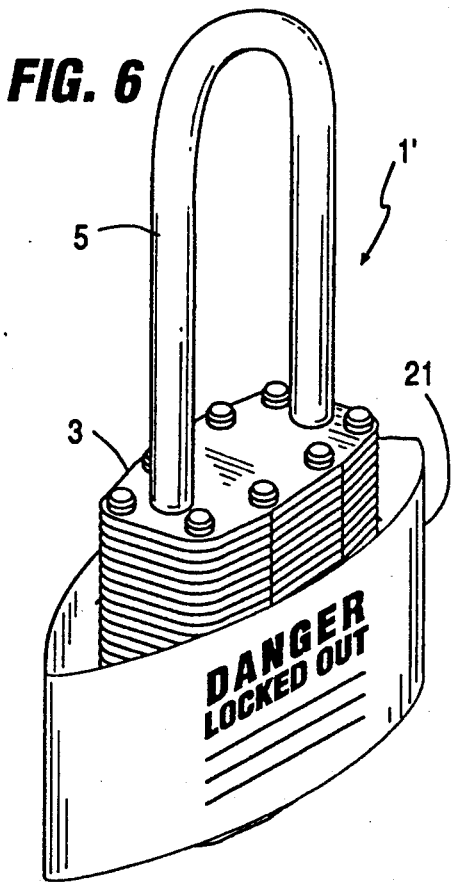

METHOD FOR MAKING LABELLED PADLOCKS

BACKGROUND OF THE INVENTION

This invention relates to padlocks used to secure hazardous instrumentalities. More specifically, the invention relates to the labelling of a padlock with a notice admonishing caution to be exercised before opening the padlock.

It is known in various industries which employ heavy machinery, high voltage electricity, highly active or toxic chemicals, or other dangerous instrumentalities or substances, to secure access to them or prevent their use with a conventional padlock. Typically, the padlock is placed through a link or loop mounted on or adjacent an electrical switch which controls electric power or the door of a cabinet or room housing the power switch or other potentially dangerous instrumentality It is desirable to place a notice on the body of the padlock to warn of the potential danger associated with opening it when used in one of the foregoing applications. Such a notice can give instructions as to required conditions for opening the padlock, the consequences of noncompliance with the conditions, and/or the identity of one or more persons to be consulted before the padlock is opened or whose well-being depends on compliance with the conditions for opening the padlock. It is further desirable to be able to imprint the foregoing information on the padlock in text or graphic form, including a likeness of the individual most likely to be affected by the opening of the padlock. Such a likeness may be accompanied by a strong admonition, e.g., "DO NOT REMOVE THIS LOCK—MY LIFE DEPENDS ON IT!"

In order to provide the utmost resistance to tampering, padlocks are generally made of hardened steel which presents a poor surface for imprinting by conventional inexpensive techniques. Although labels printed on paper can be attached to padlocks, they and the text or graphic material they carry are subject to wear and damage during handling and to deterioration which is likely to be exacerbated by chemicals or other liquids present in the environments in which the padlocks are used.

SUMMARY OF THE INVENTION

The aforementioned problems are overcome by the instant invention for which there are two preferred embodiments. The first preferred embodiment includes a padlock having a label which is highly resistant to damage or deterioration. The padlock has a body and a shackle pivotally mounted on the body, a heat shrinkable transparent sleeve snugly fitted about the body, and a label disposed between the outer surface of the padlock body and the inner surface of the sleeve. The label includes a substrate having a top side, on which the notice is imprinted or otherwise applied, covered by a heat sealed transparent protective laminate, and a bottom side coated with a layer of adhesive for adhering the label to the padlock body. The adhesive is covered by a release backing, the adhesive having a greater affinity for the substrate than for the release backing whereby the release backing is readily separated from the substrate for permitting the substrate to be affixed to the padlock body.

A method for the assembly of the apparatus of the first preferred embodiment of the invention includes imprinting the notice on the top surface of the substrate, covering the imprinted top surface of the substrate with the transparent laminate, separating the release layer from the substrate, affixing the laminated substrate to the padlock body by pressing the adhesive bottom against it, covering the laminated substrate and body with the heat shrinkable transparent sleeve, and heating the sleeve until it shrinks to snugly envelope the laminated substrate and body.

The second preferred embodiment of the invention includes a labelled padlock having a body covered with a heat shrunk sleeve on which the notice is directly imprinted. A method for the assembly of the apparatus of the second preferred embodiment of the invention includes imprinting the notice on an outer surface of a heat shrinkable sleeve, placing the sleeve over the body and then heat shrinking the sleeve to snugly envelop the body.

It is therefore an object of the invention to provide a padlock with a label that is resistant to damage or deterioration.

Another object of the invention is to provide a padlock with a label that can be easily assembled at low cost.

Still another object of the invention is to provide a padlock with a label that can include text and/or graphic printing which is readily visible to anyone having access to the padlock.

A further object of the invention is to provide a padlock with a label that can be readily changed when a new application is intended.

Other and further objects of the invention will be apparent from the following drawings and description of a preferred embodiment of the invention in which like reference numerals are used to indicate like parts in the various views.

DESCRIPTION OF THE DRAWINGS

FIG. 4 is a perspective view of the product of the first preferred embodiment of the invention during a second stage of the method for making the first preferred embodiment of the invention.

FIG. 5 is a perspective view of an element of the product of a second preferred embodiment of the invention FIG. 6 is a is a perspective view of the product of the second preferred embodiment of the invention during a stage of the method for making the second preferred embodiment of the invention.

DESCRIPTION OF THE PREFERRED EMBODIMENT

Figure 1:
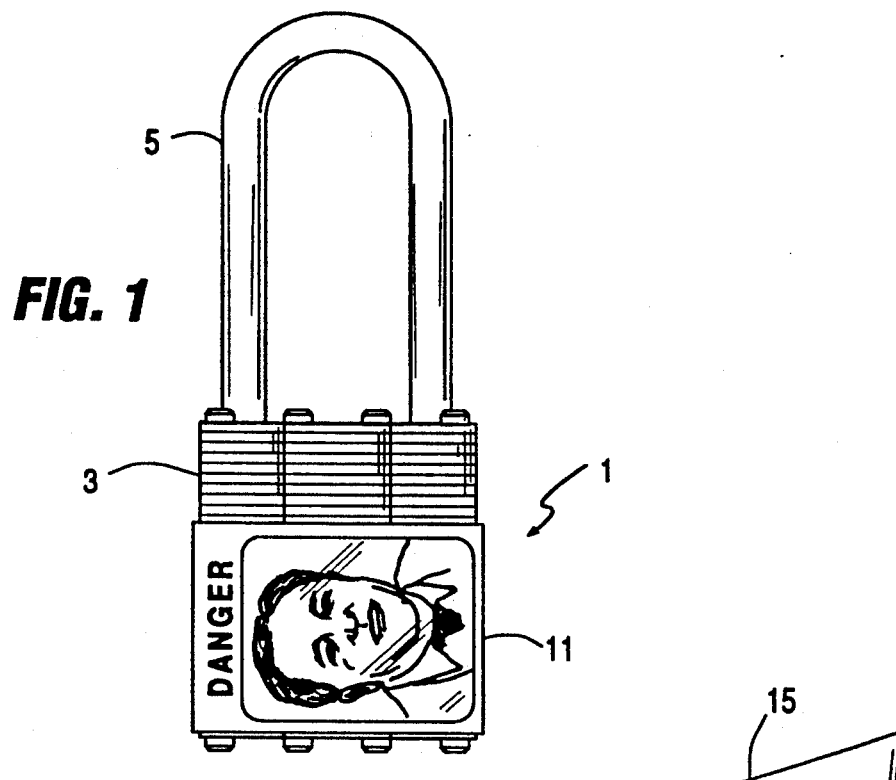
FIG. 1 is a front elevation view of the product of a first preferred embodiment of the invention.

Referring now to FIG. 1 of the drawings there is shown a padlock 1 having a shackle 5 and a body 3 covered with a label 11. The label is imprinted with a notice which can indicate that tampering with or removal of the padlock 1 is dangerous or identifying an individual having responsibility for the padlock 1 or who may be affected by its removal. A picture of the individual may be included on the padlock 1, as shown in FIG. 1, to further stress that a life may be threatened by unauthorized opening of the padlock 1.

Figure 2A:
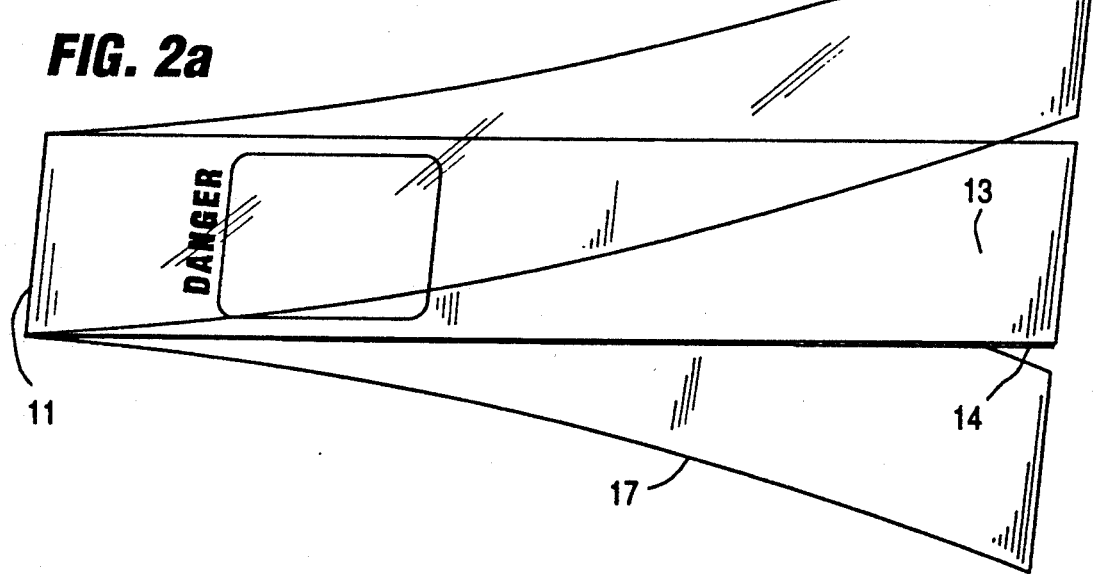
FIG. 2a is a perspective view of an element of the product of the first preferred embodiment of the invention.

The padlock shown in FIG. 1 is conventional. The notice is attached to the body 3 of the padlock 1 through the use of a four-part label 11, shown in FIG. 2a, which is made up of a label substrate 13 having a pressure sensitive adhesive layer 14, a transparent cover laminate 15, and a release backing 17.

The substrate 13 is preferably made of paper, thin cardboard or plastic having a top surface suitable to accept printing of textual or graphic information including a photograph or other likeness of a person. Hinged to one end of the substrate 13 and extending over its top side is a thin transparent cover laminate 15 which can be lifted to allow access to the top surface of the substrate 13 for printing and then lowered to cover the printed top surface of the substrate 13.

The transparent cover laminate 15 is of the same dimensions as the substrate 13 in length and width. The laminate 15 is formed from a plastic sheet material having a low melting point to enable it to be hermetically sealed to the substrate 13 upon application of heat by an iron or press (not shown) as will be known to those skilled in the art.

The bottom side of the substrate 13 is coated with the pressure sensitive adhesive layer 14. Hinged to the same end of the substrate 13 as the transparent cover laminate 15 and extending over the pressure sensitive adhesive layer 14 on the bottom side of the substrate 13 is the release backing 17 made of a waxed paper or similar material chosen so that the pressure sensitive adhesive layer 14 has a greater affinity for the substrate 13 than for the release backing 17.

Figure 2B:
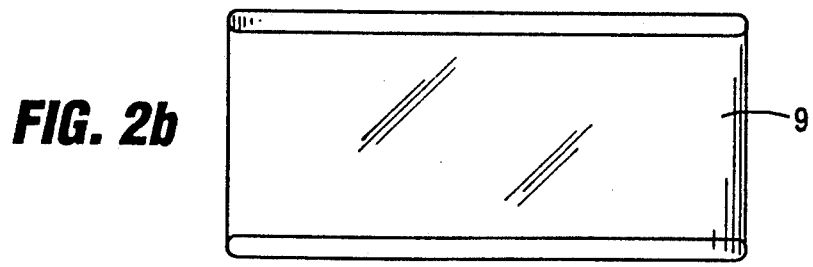
FIG. 2b is a is a perspective view of another element of the product of the first preferred embodiment of the invention.

The body 3 of the padlock 1 is covered by a sleeve 9 shown in FIG. 2b. The sleeve 9 employed in the embodiment of the invention illustrated in FIG. 1 is formed from an endless strip of a flexible transparent plastic material, such as polyvinyl chloride, which shrinks uniformly when heated. The sleeve 9 may be cut from an extruded tube of the transparent plastic material. The circumference of the sleeve 9 is large enough to enable the sleeve 9 to be opened and placed around the body 3 of the padlock 1 to which the label 11 has been affixed via the pressure sensitive adhesive layer 14 and small enough to be shrunk to snugly envelop the body S and label 11.

Preparation and assembly of the labelled padlock 1 of FIG. 1 is done as follows. First the transparent cover laminate 15 is raised above the substrate 13 and the top surface of the substrate 13 is imprinted with the desired notice. Thereafter the transparent cover laminate 15 is lowered to cover the top surface of the substrate 13. The transparent cover laminate 15 is then pressed against the substrate 13 by a heating press or iron and heated to bond the laminate 15 to the substrate 13 thereby forming a hermetic seal between the substrate 13 and laminate 15.

Next the release backing 17 is separated from the pressure sensitive adhesive layer 14 on the bottom surface of the substrate 13 by peeling it away. The release backing 17 can then be discarded having no further use in the invention.

Figure 3:
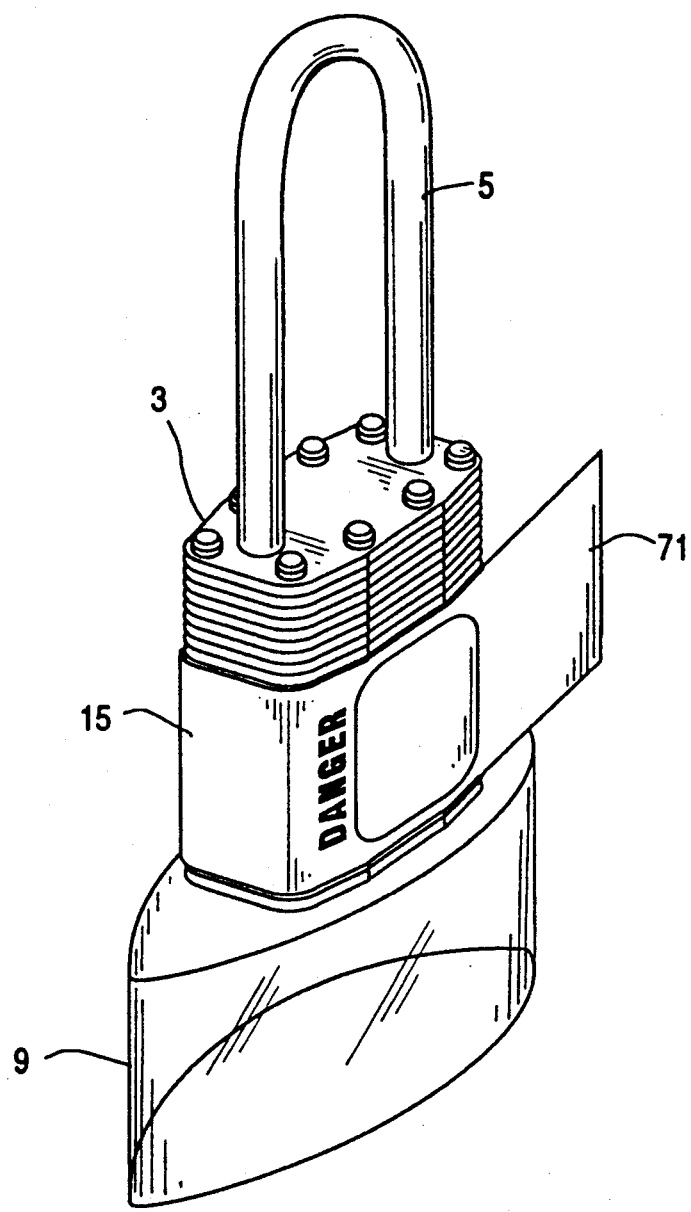
FIG. 3 is a perspective view of the product of the first preferred embodiment of the invention during a first stage of the method for making the first preferred embodiment of the invention.

The label substrate 13 is then placed on the body 3 of the padlock 1. If the label 11 is longer than the width of the body 3 of the padlock 1, its ends are wrapped around the body 3 as shown in FIG. 3. Hand pressure is applied to adhere the bottom side of the substrate 13 to the body 3 of the padlock 1 via the pressure sensitive adhesive layer 14.

The sleeve 9 is then opened and slipped over the circumference of the body 3 of the padlock 1 so that it covers the label 11 on the body 3. Finally, heat is applied by means of a hot air blower 19, as shown in FIG. 4, or by placing the padlock 1 in an oven (not shown) until the sleeve 9 shrinks sufficiently to snugly envelop the body 3 of the padlock 1.

The result is a labelled padlock 1 having a label 11 with a printed surface protected from deleterious substances by a thin transparent cover laminate 15, and from physical handling and abuse by the thicker, heavier and stronger heat shrunk sleeve 9.

A second preferred embodiment of the invention will now be described with reference to FIGS. 5 and 6. In FIG. 5, a plastic sleeve 21, made of an irradiated cross-linked modified polyolefin or similar material, has a matte surface which can be directly imprinted with a notice to be displayed on a padlock 1'. The sleeve 21 is preferably opaque to enable greater contrast between the printing constituting the notice and its background. Different colors may be used for the opaque sleeve 21 to indicate danger or to identify the category of employee to whom the padlock relates.

Because the notice is printed directly on the opaque sleeve 21, the need for an underlying label to be affixed to the body 3 of the padlock 1' is obviated. Instead the opaque sleeve 21 is slipped directly over the body 3 of the padlock 1' as shown in FIG. 6. Completion of the assembly is accomplished by heating and shrinking the opaque sleeve 21 in a manner similar to that disclosed above with respect to FIG. 4.

The padlocks 1 and 1' can be relabelled by cutting away the sleeves 9 and 21 and, where a label 11 is used, removing and replacing the label or adhering a new label over the old one. A new sleeve 9 or 21 can then be placed over the padlock body and shrunk by heating.

It is to be appreciated that the foregoing is a description of two preferred embodiments of the invention to which other variations and modifications may be made without departing from the spirit and scope of the invention. For example, various combinations of transparent and opaque regions may be used on the sleeve with an underlying label adhered to the body of the padlock and additional printing on the sleeve. The sleeve may also wrapped around the body of the padlock vertically so that it passes between the prongs of the shackle, in addition to horizontally as shown in the drawings.

What is claimed is:

1. A method of labelling the body of a padlock comprising
    imprinting a notice on the top surface of a substrate having a bottom surface covered with an adhesive,
    covering said imprinted top surface of said substrate with a transparent laminate,
    affixing said laminated substrate to said body by pressing said adhesive bottom thereagainst,
    covering said laminated substrate and body with a heat shrinkable transparent sleeve, and
    heating said sleeve until it shrinks to snugly envelop said laminated substrate and body.

2. A method of labelling the body of a padlock according to claim 1 wherein the adhesive on the bottom side of said substrate is covered with a release layer further comprising separating said release layer from said substrate before affixing said laminated substrate to said body.

3. A method of labelling the body of a padlock comprising covering the body of said padlock with a heat shrinkable plastic sleeve displaying a notice and heating the sleeve to shrink it until it snugly envelops said body.

4. A method of labelling the body of a padlock according to claim 3 further comprising imprinting said notice on an outer surface of said sleeve before heat shrinking it around said body.

5. A method of labelling the body of a padlock according to claim 3 further comprising imprinting a message on a surface of a substrate having an opposite surface coated with an adhesive, and affixing said substrate adhesive surface to said body before said body is covered with said sleeve.

6. A method of labelling the body of a padlock according to claim 5 further comprising covering the printed surface of said substrate with a laminate before affixing said substrate to said body.

7. A method of labelling the body of a padlock according to claim 6 further comprising removing a release backing from said adhesive before applying said substrate to said body.

* * * * *